3,840,585
PROCESS FOR MANUFACTURING ALKYL ESTERS OF β-(3,5-DI-t-BUTYL - 4 - HYDROXYPHENYL)-PROPIONIC ACID
Hayao Yamada, Tondabayashi, Osaka, and Yoshinori Tanide, Nara, Japan, assignors to Osaka Seika Kogyo Kabushiki Kaisha, Osaka-shi, Japan
No Drawing. Filed Aug. 25, 1972, Ser. No. 283,664
Int. Cl. C07c 69/76
U.S. Cl. 260—473 S      4 Claims

ABSTRACT OF THE DISCLOSURE

In a process for producing an alkyl ester of β-(3,5-di-t-butyl-4-hydroxyphenyl)-propionic acid by reacting 2,6-di-t-butyl phenol with an alkyl acrylate, an improvement which comprises carrying out the reaction in the presence of a catalytic amount of a complex metal hydride.

---

This invention relates to an improved process for manufacturing alkyl esters of β-(3,5-di-t-butyl-4-hydroxyphenyl)-propionic acid.

Alkyl esters of β-(3,5-di-t-butyl-4-hydroxyphenyl)-propionic acid are known in the art and have been used as antioxidants for various organic substances, such as rubbers, plastics, petroleum, hydrocarbons, lubricants, greases, waxes, fats, etc.

There is disclosed in Japanese Patent Publication No. 28,324/1964 to produce such esters by reacting 2,6-di-t-butylphenol with an alkyl acrylate in the presence of a basic catalyst, such as a quaternary ammonium salt, alkali metal amide, alkali metal alkoxide, alkali metal hydroxide or alkaline earth metal alkoxide. According to this method, however, undesired polymerization reaction occurs unavoidably to produce a considerable amount of alkyl acrylate polymer, reducing the yield and purity of the resultant ester. In fact it is necessary for practical uses that the esters obtained by the above method be subjected to complicated purification procedures, for example, high vacuum distillation, recrystallization conducted repeatedly, etc. Moreover, an excess amount of alkyl acrylate is to be supplied to the reaction system during the reaction in order to compensate for that consumed in the side reaction, this rendering the process troublesome and uneconomical.

Various attempts have been made to prevent the undesired polymerization of alkyl acrylate, but no successful method has been proposed yet.

An object of the invention is to provide an improved method of producing alkyl esters of β-(3,5-di-t-butyl-4-hydroxyphenyl)-propionic acid in a high yield without undesired side reaction.

Another object of the invention is to provide a method capable of obtaining alkyl esters of β-(3,5-di-t-butyl-4-hydroxyphenyl)-propionic acid with a high purity by simple purification procedure free from contamination with byproducts.

These and others objects of the invention will be apparent from the following description.

In reacting 2,6-di-t-butyl phenol with an alkyl acrylate to produce an alkyl ester of β-(3,5-di-t-butyl-4-hydroxyphenyl)-propionic acid, according to the method of the invention, the reaction is carried out in the presence of a catalytic amount of a complex metal hydride.

According to the researches of the present inventors it has been found that complex metal hydrides display excellent catalytic activity on the addition reaction of 2,6-di-t-butylphenol with an alkyl acrylate to produce the above ester, but effectively prevent undesired polymerization of the alkyl acrylate, making it possible to produce the desired ester in a high order of yield and with a high purity free from the contamination with undesired polymer. In fact, the esters can be obtained, in accordance with the method of the invention, in a high yield of more than 85%, which has never been attained by the conventional method. Further, the resultant esters can be used for practical purpose without any complicated purification procedure, since they are free from contamination with byproducts.

The catalyst used in accordance with the present invention are complex metal hydrides, which are known in the art and include those containing active hydrogen in the molecules and displaying reducing effect when decomposed in the presence of acid. Examples thereof are $NaBH_4$, $LiBH_4$, $KBH_4$, $LiAlH_4$, $Mg(AlH_4)_2$, $Al(BH_4)_3$, $Ca(BH_4)_2$, $NaAl(OCH_3)_2H_2$, $NaAl(CH_3)_2H_2$, $NaAlH_4$, etc. Of these $NaBH_4$, $LiBH_4$, $KBH_4$, $LiAlH_4$, $NaAlH_4$, $Mg(AlH_4)_2$, $Al(BH_4)_3$ and $Ca(BH_4)_2$ are preferable, best preferable are $NaBH_4$, $LiBH_4$ and $LiAlH_4$. The complex metal hydride is used at least in a catalytic amount. Preferably such amount is in the range of 1 to 5 weight percent, based on the weight of the starting 2,6-di-t-butylphenol.

The alkyl acrylates used in the invention include esters of acrylic acid with alkanols, preferably esters of acrylic acid with alkanols having 1 to 8 carbon atoms. Examples thereof are methyl acrylate, ethyl acrylate, propyl acrylate, isopropyl acrylate, butyl acrylate, pentyl acrylate, hexyl acrylate, octyl acrylate, etc. The alkyl acrylate may be used in a stoichometric amount or in a small excess amount, since it is never consumed in undesired side reaction, such as, polymerization reaction.

In accordance with the present invention the reaction is preferably carried out using organic solvents, though it can proceed without the solvents. Examples of the solvents are diethyl ether, diisopropyl ether and like dialkyl ethers, dimethyl formamide, dimethyl acetamide and like N,N-dialkyl acidamide, benzene, xylene and like aromatic hydrocarbons, methyl ethyl ketone, methyl butyl ketone and like dialkyl ketones, etc. The solvent can be used in an amount varying over a wide range, but usually in one to three times the weight of the starting 2,6-di-t-butylphenol used. The reaction can usually be conducted at a temperature ranging from 30 to 150° C., preferably from 60 to 70° C.

After the reaction, acids such as formic acid, acetic acid, etc. are added to the resultant reaction mixture to decompose the catalyst used and thereafter the reaction mixture is cooled to precipitate the ester. The precipitated ester is then recovered and, if necessary, washed with water, isopropanol, etc. The ester thus recovered has a high order of purity and can be used for practical purposes such as for antioxidation of various organic materials.

For a better understanding of the invention examples are given below.

Example 1

43 g. (0.5 mole) of methyl acrylate was added to 103 g. (0.5 mole) of 2,6-di-t-butyl phenol and the mixture was heated to 40° C. To the mixture was added 1 g. of $LiAlH_4$ dissolved in 20 ml. of dimethyl formamide. The resultant mixture was heated at 40° C. for 2 hours, at 50° C. for 10 hours and at 60 to 70° C. for 30 hours to effect addition reaction.

To the resultant reaction mixture was added 300 ml. of toluene and the mixture was cooled to 20° C. Thereafter, 20 ml. of 50 wt. percent acetic acid was slowly added to the cooled mixture to decompose the catalyst used. The toluene layer of the mixture was thoroughly washed with water and dehydrated with dried magnesium sulfate, followed by recovery of toluene by distillation under reduced pressure. 100 ml. of isopropanol was added to the residue and the mixture was cooled to 5° C., whereby 133 g. of methyl-[β-(3,5-di-t-butyl-4-hydroxyphenyl)]-propionate having a melting point of 64 to 65° C. was obtained in the form of white crystals. Yield was 90% and purity was more than 99%.

Examples 2 to 7

The same reaction as in Example 1 was conducted except that catalysts and solvents shown in Table 1 below were employed. The results are shown in Table 1 below.

TABLE 1

| Ex. | Catalyst | Solvent | Product Amount (g.) | Yield (percent) | Purity (percent) |
|---|---|---|---|---|---|
| 2 | NaBH$_4$ | Dimethyl formamide. | 131 | 90 | >99 |
| 3 | KBH$_4$ | ----do------- | 134 | 91.7 | >99 |
| 4 | NaAlH$_4$ | Benzene------ | 126 | 86.4 | >99 |
| 5 | Mg(AlH$_4$)$_2$ | Methylethyl ketone. | 131 | 89.7 | >99 |
| 6 | Al(BH$_4$)$_3$ | Xylene------- | 130 | 89.0 | >99 |
| 7 | Ca(BH$_4$)$_2$ | Ethyl ether--- | 129 | 88.5 | >99 |

Example 8

92 g. (0.5 mole) of n-octyl acrylate was added to 103 g. (0.5 mole) of 2,6-di-t-butylphenol and to the mixture was added 1 g. of sodium borohydride (NaBH$_4$) dissolved in 20 ml. of dimethyl formamide. The resultant mixture was heated at 40° C. for 3 hours, 60° C. for 5 hours and 70° C. for 20 hours to effect addition reaction.

200 ml. of toluene was added to the resultant reaction mixture and the mixture was cooled to 20° C. Thereafter, 50 ml. of 50 wt. percent acetic acid was added thereto to decompose the catalyst used. The toluene layer was separated and washed with water several times, followed by recovery of the toluene under reduced pressure. To the residue was added 200 ml. of isopropanol and the mixture was cooled to precipitate product. The product was washed with isopropanol, whereby 166 g. of n-octyl-[β-(3,5-di-t-butyl - 4-hydroxyphenyl)] propionate having a melting point of 47 to 48.5° C. was obtained. Yield was 90% and purity was more than 99%.

Comparative Examples 1 to 4

The same reaction as in Example 8 was carried out except that 1 g. of basic catalysts dissolved in 20 ml. of dimethyl formamide were used in place of NaBH$_4$ for comparison. In the examples the residue from which toluene was recovered was subjected to a high vacuum distillation under a pressure of 1 to 2 mm. Hg to obtain the product. The results are shown in Table 2 below.

TABLE 2

| Comp. Ex. | Catalyst | Product Amount (g.) | Yield (percent) |
|---|---|---|---|
| 1 | KOH | 127 | 65 |
| 2 | NaOH | 84 | 43 |
| 3 | NaNH$_2$ | 113 | 58 |
| 4 | NaOCH$_3$ | 138 | 71 |

What we claim is:

1. In a process for producing a C$_{1-8}$ alkyl ester of β-(3,5-di-t-butyl-4-hydroxyphenyl)-propionic acid by reacting 2,6-di-t-butyl phenol with C$_{1-8}$ alkyl acrylate, the improvement which comprises carrying out the reaction with a catalytic amount of a complex metal hydride selected from the group consisting of NaBH$_4$, LiBH$_4$, KBH$_4$, LiAlH$_4$, Mg(AlH$_4$)$_2$, Al(BH$_4$)$_3$, Ca(BH$_4$)$_2$, NaAl(OCH$_3$)$_2$H$_2$, NaAl(CH$_3$)$_2$H$_2$ and NaAlH$_4$.

2. The process according to Claim 1, in which said complex metal hydride is one species selected from the group consisting of NaBH$_4$, LiBH$_4$, KBH$_4$, LiAlH$_4$, NaAlH$_4$, Mg(AlH$_4$)$_2$, Al(BH$_4$)$_3$ and Ca(BH$_4$)$_2$.

3. The process according to Claim 2, in which said complex metal hydride is one species selected from the group consisting of NaBH$_4$, LiBH$_4$ and LiAlH$_4$.

4. The process according to Claim 1, in which said complex metal hydride is used in an amount of 1 to 5 weight percent, based on the weight of the starting 2,6-di-t-butylphenol.

References Cited

UNITED STATES PATENTS

| 2,916,532 | 12/1959 | Schmerling et al. | 260—671 C |
| 2,927,085 | 3/1960 | Gordon et al. | 260—671 C |
| 2,927,086 | 3/1960 | Gordon et al. | 260—671 C |
| 3,642,868 | 2/1972 | Dexter et al. | 260—473 S |
| Re. 27,004 | 12/1970 | Meier et al. | 260—473 S |

FOREIGN PATENTS 28,324  12/1964  Japan.

LORRAINE A. WEINBERGER, Primary Examiner

J. F. TERAPANE, Assistant Examiner